May 29, 1951 R. F. MALLINA 2,554,582

MAGNETIC RECORDER

Filed June 6, 1947

INVENTOR
R. F. MALLINA
BY R. Mallina
ATTORNEY

Patented May 29, 1951 2,554,582

UNITED STATES PATENT OFFICE 2,554,582

MAGNETIC RECORDER

Rudolph F. Mallina, Hastings on Hudson, N. Y., assignor to Bell Telephone Laboratories, Incorporated, New York, N. Y., a corporation of New York Application June 6, 1947, Serial No. 752,982

4 Claims. (Cl. 179—100.2)

This invention relates to magnetic recorders and particularly to magnetic recorders in which signals are recorded in a plurality of tracks on a tape or band.

In order that signals may be satisfactorily recorded on a moving tape, the magnetic material of or on the tape must be maintained in intimate contact with the pole-pieces of the recording magnets. This is not particularly difficult if there is but a single recording magnet. Where signals are recorded in a plurality of tracks on the same tape, however, a recording magnet is required for each track. Although the pole-pieces of the magnets may be narrow, the magnets themselves are necessarily somewhat bulky and, if placed side by side, a wide tape must be used. By placing the magnets in echelon, spaced both transversely and longitudinally with respect to the tape, a narrow tape may be employed, but then the magnets are spread over a considerable length of the tape and it becomes difficult to maintain the tape constantly in intimate contact with the pole-pieces of all the magnets.

The present invention discloses a simple and effective means for maintaining the tape in contact with the pole-pieces of all the recording magnets.

A feature of the invention is the arrangement of the recording magnets whereby the tape is maintained in contact with them without the use of individual pressure devices nor, in fact, the addition of any parts to the usual recording mechanism.

This and other features of the invention will be apparent from the accompanying description, the appended claims, and the drawing, in which:

Figure 2:
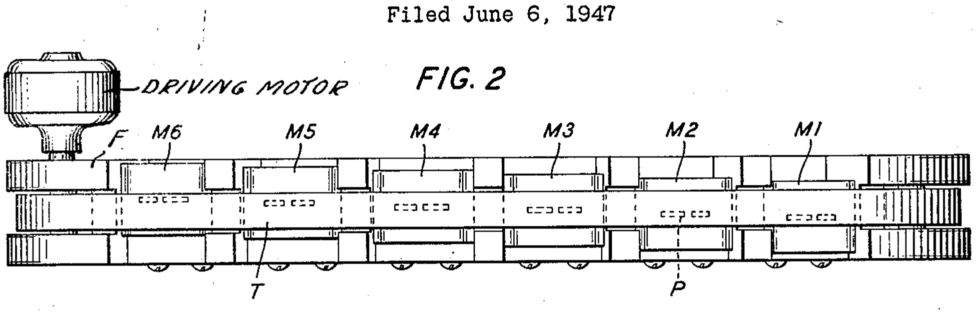
Fig. 2 shows a top view of the same recorder.

In the drawings, M1, M2, M3, M4, M5, and M6 are the recording magnets, each having pole-pieces, such as the pole-pieces P of magnet M2, adapted to contact a narrow path on the tape T on which signals from the magnets are recorded. The magnets are mounted in order in a frame F but are individually spaced transversely in said frame, as shown in Fig. 2, so that the pole-pieces of each magnet contact an individual track on tape T. The magnetic tape T passes over the pole-pieces of all the magnets, being located transversely by the extended sides of the frame F, and over two rollers R and R1, one of which is adapted to drive the tape for recording by means of the motor shown or other suitable driving means. A third roller R2, in the loop of the tape T is resiliently mounted, the spring S, operating on said roller maintaining a tension on the tape T.

Figure 1:
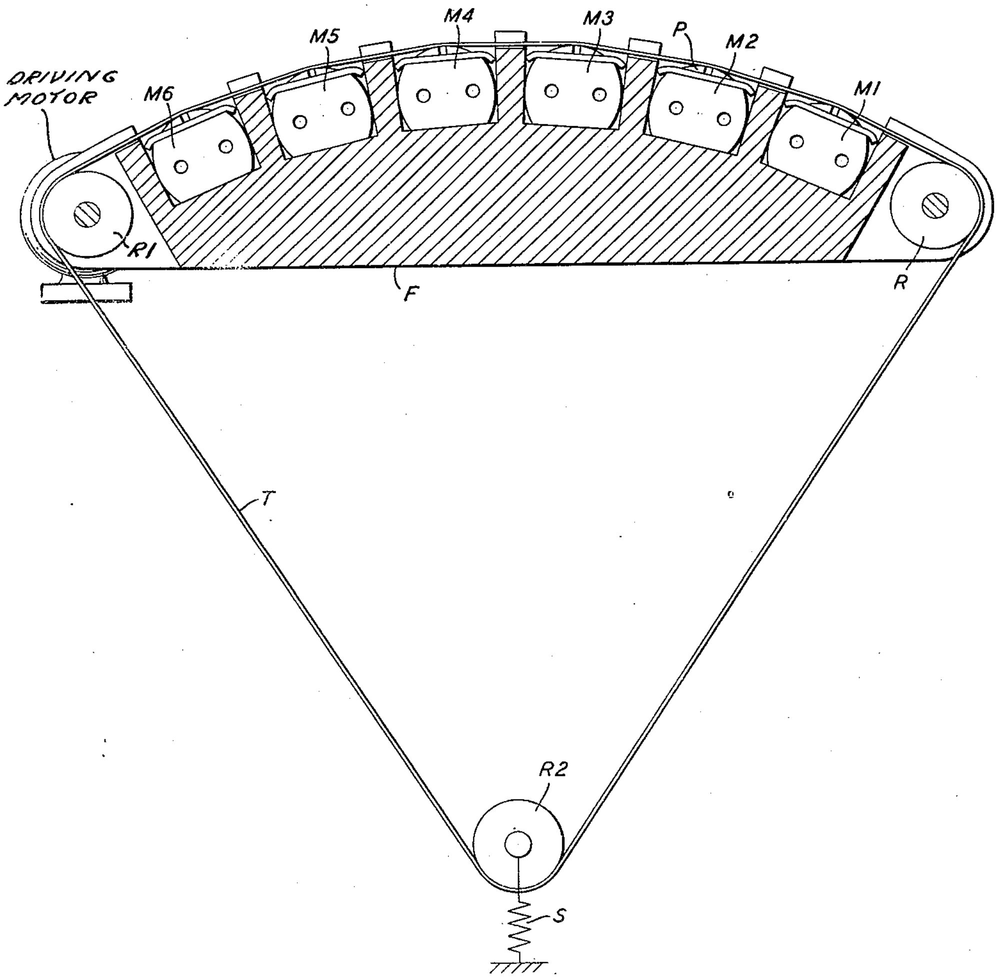
Fig. 1 shows a side view of a magnetic recorder.

The construction so far described is a common form of magnetic recorder. In accordance with the present invention, however, the frame F is so formed that the pole pieces of the magnets mounted in it are not in a straight line but project above rollers R and R1 in an arc or curve in a plane perpendicular to the surface of the tape T as is clearly shown in Fig. 1. The tension imparted to the tape T by the spring S acting through roller R2 tends to draw the tape T into a straight line between rollers R and R1 but the tape is prevented from assuming that form by the projecting pole-pieces of the magnets M1, M2, M3, M4, M5 and M6. The tape T, therefore, is pressed on each of said pole-pieces and the more tension is applied to said tape, the more does it press upon each of the pole-pieces. The pressure of the tape upon the pole-pieces of any one magnet, such as the pole-pieces P of magnet M2, is dependent upon the amount by which said pole-pieces project above the straight line joining the pole-pieces of the two adjacent magnets M1 and M3. If the pole-pieces of each magnet project the same amount above the line joining the pole-pieces of the two magnets adjacent to it, the pressure of the tape on each of the pole-pieces will be the same. In this case, the pole-pieces of the magnets will form an arc of a circle.

While in the present illustration only six recording magnets are shown, it is obvious that the construction may be applied equally well to any number of recording magnets and said magnets may be closely or widely spaced. Also, although in the present embodiment of the invention, a continuous band of tape is used and tension applied to said tape by a roller and spring, it is likewise obvious that other arrangements of the tape could be employed, such as a reel from which the tape could be passed over the recording magnets to a take-up reel, and that any suitable method can be used to maintain a tension on the tape.

I have described my invention as applied to a magnetic recorder having a plurality of recording magnets each contacting a different path or track on a magnetic tape. It is obvious, however, that the invention is equally applicable to a magnetic recorder in which all of the recording magnets contact the same path on the tape and to a magnetic recorder in which the recording magnets are arranged along a wire. Also, while I have described the magnets of my recorder as recording magnets, any or all of said magnets can, of course, be employed to perform other functions such as reproducing or erasing of the signals on the magnetic medium. Modifications, adaptations, and applications of my invention, other than those mentioned above, will also occur to those skilled in the art.

The terms and expressions which I have used to describe my invention and its elements are used as terms of description and not of limitation and I have no intention in the use of such terms and expressions of thereby excluding equivalents or modifications of the features shown and described or parts thereof but, on the contrary, intend to include therein any and all equivalents and modifications that may be employed without departing from the spirit of the invention.

What is claimed is:

1. In a magnetic recorder, a magnetic tape, two supports for said tape, means for stretching said tape between said two supports, means for moving said tape longitudinally, three or more recording magnets arranged in an arc between said two supports, the pole surfaces only of said magnets all simultaneously contacting said tape and deflecting it from the straight line between said two supports, and means for supporting said magnets and said tape in said arrangement.

2. In a magnetic recorder, a magnetic tape, means for moving said tape longitudinally, means for maintaining said tape in tension, a plurality of recording magnets so arranged in relation to said tape that the pole surfaces only of each of said magnets contact said tape in a different longitudinal path to transversely deflect said tape, and means for supporting said magnets and said tape in said relation.

3. In a magnetic recorder, a magnetic tape, two supports for said tape, means for stretching said tape between said supports, a plurality of recording magnets between said two supports so arranged in relation to said tape that the pole surfaces only of said magnets will simultaneously contact said tape and deflect it from the straight line between said two supports, and means for supporting said magnets and said tape in said arrangement.

4. In a magnetic recorder, a magnetic medium, a plurality of recording magnets, and means for supporting said medium and said magnets in cooperative relation whereby the pole surfaces only of each of said magnets contact and deflect said medium, said last-mentioned means comprising an arcuate support for said magnets and a resilient support for said medium so disposed in relation to said arcuate support as to maintain said medium under tension between said arcuate support and said resilient support.

RUDOLPH F. MALLINA.

REFERENCES CITED

The following references are of record in the file of this patent:

UNITED STATES PATENTS

| Number | Name | Date |
|---|---|---|
| 699,630 | Pedersen | May 6, 1902 |
| 2,080,812 | Fairbanks | May 18, 1937 |
| 2,247,847 | Cfleumer | July 1, 1941 |
| 2,335,277 | Heller | Nov. 30, 1943 |
| 2,352,023 | Schuller | June 20, 1944 |
| 2,420,802 | Thompson | May 20, 1947 |
| 2,426,838 | Miller | Sept. 2, 1947 |
| 2,428,449 | Camras | Oct. 7, 1947 |
| 2,475,421 | Camras | July 5, 1949 |
| 2,475,439 | Waller | July 5, 1949 |
| 2,484,097 | Keller | Oct. 11, 1949 |
| 2,493,742 | Begun | Jan. 10, 1950 |